United States Patent
Kemp et al.

(10) Patent No.: US 12,494,918 B2
(45) Date of Patent: Dec. 9, 2025

(54) RE-IMAGING IMAGE DATA ON ELECTRONIC DEVICES

(71) Applicant: DISH Network L.L.C., Englewood, CO (US)

(72) Inventors: Geoffrey Charles Kemp, Aurora, CO (US); Fred Earl Starks, Centennial, CO (US); Mary Abigale Strebel, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 826 days.

(21) Appl. No.: 17/837,327

(22) Filed: Jun. 10, 2022

(65) Prior Publication Data

US 2023/0336359 A1    Oct. 19, 2023

Related U.S. Application Data

(60) Provisional application No. 63/331,289, filed on Apr. 15, 2022.

(51) Int. Cl.
  *H04L 9/32*   (2006.01)
  *H04L 9/40*   (2022.01)

(52) U.S. Cl.
  CPC ........ *H04L 9/3247* (2013.01); *H04L 63/0428* (2013.01)

(58) Field of Classification Search
  CPC ...... H04L 9/3247; H04L 63/0428; H04L 9/14
  See application file for complete search history.

(56) References Cited

U.S. PATENT DOCUMENTS

| | | | | |
|---|---|---|---|---|
| 5,907,619 A | * | 5/1999 | Davis | H04N 7/1675 |
| | | | | 713/180 |
| 10,996,969 B1 | * | 5/2021 | Harland | G06F 13/105 |
| 11,079,960 B2 | * | 8/2021 | Cheru | G06F 3/0614 |
| 11,216,591 B1 | * | 1/2022 | Burton | H04L 9/0643 |

(Continued)

OTHER PUBLICATIONS

Weaver, Nicholas, Robin Sommer, and Vern Paxson. "Detecting Forged TCP Reset Packets." NDSS. 2009. (Year: 2009).*

(Continued)

*Primary Examiner* — Jung W Kim
*Assistant Examiner* — Sameera Wickramasuriya
(74) *Attorney, Agent, or Firm* — Wash Park IP Ltd.; John T. Kennedy

(57) ABSTRACT

Devices, systems, and processes are described for re-imaging image data on a client device. A process may include establishing, by a client device, a communications link with a server; communicating an image data request to the server; wherein the image data request identifies a first Image Data Segment (1IDS) in an Image Data Volume (IDV); receiving a 1IDS packet from the server; decompressing the 1IDS packet; identifying a first header and a 1IDS in the 1IDS packet; decrypting the first header and the 1IDS; identifying a first signature in the decrypted first header; first calculating a third signature for the decrypted 1IDS; comparing the first signature to the third signature; and accepting, when the first signature matches the third signature, the 1IDS for non-transient storage on a computer readable medium for the client device. The process may include second calculating a total signature for the 1IDS packet.

20 Claims, 7 Drawing Sheets

(56) References Cited

U.S. PATENT DOCUMENTS

| | | | |
|---|---|---|---|
| 11,449,613 B2* | 9/2022 | Oz | H04L 63/14 |
| 11,716,409 B2* | 8/2023 | Su | H04L 47/125 |
| | | | 370/392 |
| 2005/0283594 A1* | 12/2005 | Kano | H04L 67/1097 |
| | | | 713/1 |
| 2007/0271429 A1* | 11/2007 | Eguchi | G06F 11/1469 |
| | | | 714/E11.13 |
| 2008/0010462 A1* | 1/2008 | Murakami | G06F 21/64 |
| | | | 713/176 |
| 2011/0083015 A1* | 4/2011 | Meier | H04L 9/3247 |
| | | | 713/176 |
| 2011/0138192 A1* | 6/2011 | Kocher | H04L 9/003 |
| | | | 713/189 |
| 2012/0036565 A1* | 2/2012 | Gamez | G06F 21/52 |
| | | | 726/5 |
| 2013/0138966 A1* | 5/2013 | Tagashira | H04L 9/3242 |
| | | | 713/179 |
| 2014/0181039 A1* | 6/2014 | Harrison | G06F 3/0608 |
| | | | 707/652 |
| 2015/0172056 A1* | 6/2015 | Meunier | G08G 1/04 |
| | | | 380/28 |
| 2016/0203210 A1* | 7/2016 | Leuwer | G06F 16/285 |
| | | | 707/737 |
| 2017/0155514 A1* | 6/2017 | Schulz | G06F 21/57 |
| 2017/0329594 A1* | 11/2017 | Huang | H04L 9/3226 |
| 2018/0330095 A1* | 11/2018 | Packer Ali | H04L 9/3247 |
| 2019/0121705 A1* | 4/2019 | Mayo | G06F 16/1752 |
| 2019/0179593 A1* | 6/2019 | Sakuma | H04N 1/41 |
| 2020/0358621 A1* | 11/2020 | Ngo | H04L 67/561 |
| 2020/0410822 A1* | 12/2020 | Lukasik | G07F 17/3209 |

OTHER PUBLICATIONS

Massoudi, Ayoub, et al. "Overview on selective encryption of image and video: challenges and perspectives." Eurasip Journal on information security 2008.1 (2008): 179290. (Year: 2008).*

* cited by examiner

| SERVER 102 | CLIENT DEVICE 108 |
|---|---|

804 SERVER DATA OPERATIONS

404A: LOCATE IMAGE DATA VOLUME (IDV);
404B: RETRIEVE IMAGE DATA SEGMENT (IDS) FROM IDV;
   804B2: IDENTIFY EXCLUSION ZONE
404C: GENERATE 1ST SIGNATURE FOR IDS;
   804C2: EXCLUDE EXCLUSION ZONE FROM 1ST SIGNATURE GENERATION
404D: ENCRYPT IDS AND 1ST SIGNATURE;
404D2: GENERATE HEADER FOR IDS;
404E: CALCULATE 2ND SIGNATURE FOR IDS;
   804E2: EXCLUDE EXCLUSION ZONE FROM 1ST SIGNATURE GENERATION
404G: COMPRESS ALL;
   804G2: ENCRYPT COMPRESSED DATA;
   804G3: GENERATE 2ND HEADER INCLUDING 2ND SIGNATURE AND ENCRYPTION INITIALIZATION VECTOR;
   804G4: ENCRYPT 2ND HEADER;
404H: PACKETIZE COMPRESSED DATA AND SEND
404I: SEND ENCRYPTED 2ND HEADER

FIG. 8

SERVER 102              CLIENT DEVICE 108

907 CLIENT DEVICE DATA OPERATIONS

908: HEADER OPERATIONS

908A: REQUEST 1st HEADER FOR 1st IDS
908B: COMPUTE 1ST SIGNATURE
908C: REPEAT 908A AND 908B UNTIL 1ST HEADER IS PROCESSED
908D: REQUEST 2ND HEADER FOR 2nd IDS
908E: COMPUTE 2ND SIGNATURE
908F: REPEAT 908D AND 908E UNTIL 2ND HEADER IS PROCESSSED
908G: COMPUTE 1ST ACCUMULATED SIGNATURE (1AS)
908H: REPEAT 908D-908G UNTIL ALL HEADERS PROCESSED

910: IDS OPERATIONS

910A: REQUEST 1ST IDS PACKET
910B: DECOMPRESS 1ST IDS PACKET
910C: DECRYPT 1st IDS PACKET
910D: COMPUTE 1ST IDS SIGNATURE
910E: WRITE 1ST IDS PACKET & 1ST IDS SIGNATURE TO NON-VOLATILE STORAGE
910F: REQUEST 2ND IDS PACKET
910G: DECOMPRESS 2ND IDS PACKET
910H: DECRYPT 2ND IDS PACKET
910I: COMPUTE 2ND IDS SIGNATURE
910J: COMPUTE 2ND ACCUMULATED SIGNATURE (2AS)
910K: REPEAT 908M-908R UNTIL ALL IDS PACKETS IN IDV PROCESSED

912: VERIFICATION OPERATIONS
912A: VERIFY 1st HEADER SIGNATURE MATCHES 1ST IDS SIGNATURE
912B: VERIFY NTH HEADER SIGNATURE MATCHES NTH IDS SIGANTURE
912C: VERIFY 1AS MATCHES 2AS
912D: RE-IMAGING SUCCESS OR FAILURE

FIG. 9

RE-IMAGING IMAGE DATA ON ELECTRONIC DEVICES

CROSS-REFERENCE TO RELATED MATTERS

This application claims priority to, and incorporates by reference in its entirety, U.S. Provisional Application Ser. No. 63/331,289, which was filed on 15 Apr. 2022, in the name of inventors Geoffrey Charles Kemp, Fred Earl Starks, and Mary Abigale Strebel, and entitled "Re-imaging Image Data on Electronic Devices."

TECHNICAL FIELD

The technology described herein generally relates to devices, systems, and processes for loading software image data onto an electronic device.

BACKGROUND

Electronic devices commonly are being configured in the factory or in the field with known software data sets (herein, "image data"). The image data, which may also be commonly referred to as "factory data," provides a known operating software data set for the electronic device. When image data is executed by a suitable processor, operation of the electronic device proceeds in accordance with a known operating environment that is uninfluenced by other data sets, both friendly and/or hostile data sets, such as software updates, viruses, or the like. Image data may be logically represented as a data set (herein, an "image data volume (IDV)") that includes two or more image data segments (each being an "image data segment (IDS)").

When an electronic device is corrupted by malicious, defective, unnecessary, or other undesired data, resetting of the device to the image data is often pursued. First, the data on the device is permanently deleted. Such deletions are often referred to as a "factory reset," "bit resetting," "wiping of the data," or the like (herein, an "image data reset"). Image data resetting may occur in any setting, such as a factory, in the field, at a repair facility, or otherwise. An image data resetting may occur directly (e.g., where a technician initiating the image data resetting has direct access to the given electronic device), remotely, or otherwise. During image data resetting, the given electronic device may be inoperable, except for rudimentary data operations, such as basic input-output system (BIOS) operations, and the like. Image data resetting may occur with respect to all or some of the data used by a given electronic device.

Accordingly, after an image data reset of an electronic device, the image data needs to be reloaded, from a known source, onto the device. Today, image data commonly includes gigabytes of data. Given the size of image data, reloading the image data onto an electronic device to a factory default or other known configuration (herein, a "factory setting") is often not possible in a continuous or single file transfer. Further, image data is often compressed and encrypted, while in transfer. Upon receipt by the electronic device, the image data commonly is decompressed and then decrypted while being stored in a known, "safe" repository before the image data is used by the electronic device for its intended purposes. Non-limiting examples of "safe" repositories include an electronic device's non-volatile data store(s), such as provided by FLASH memory, forms of electrically erasable programmable read-only memory (EEPROM), and the like. A "safe" repository is commonly provided in and with an electronic device but may be provided remotely.

Given the large data size and the need to both decompress and decrypt the image data while storing in a non-volatile data, processors, cache-memories used by processors, random access memories (RAM) and other common components of electronic devices are not capable of loading image data following an image data resetting. Accordingly, needs exist for loading image data onto electronic devices after an image data reset. The various implementations and embodiments described herein provide devices, systems and processes which address the above and other concerns.

SUMMARY

The various implementations described herein provide devices, systems, and processes for re-imaging image data on electronic devices.

In accordance with at least one implementation, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a process which includes establishing, by a client device, a communications link with a server; communicating an image data request to the server, where the image data request identifies a first image data segment ("IDS") in an image data volume ("IDV"). The process may also include receiving a first IDS packet from the server; decompressing the first IDS packet; identifying a first header and a first IDS in the first IDS packet; decrypting the first header and the first IDS; identifying a first signature in the decrypted first header; first calculating a third signature for the decrypted first IDS; comparing the first signature to the third signature; and accepting, when the first signature matches the third signature, the first IDS for non-transient storage on a computer readable medium for the client device. Other embodiments of this aspect include corresponding computer systems, apparatus, and computer programs recorded on one or more computer storage devices, each configured to perform the actions of the methods.

Implementations may include one or more of the following features. The process may include: second calculating a total signature for the first IDS packet. The IDV may include second (2nd) through nth (2nd-nth) IDSs; where the $2^{nd}$ to $n^{th}$ IDSs are respectively received, from the server and by the client device, in $2^{nd}$-$n^{th}$ IDS packets, with the $2^{nd}$-$n^{th}$ IDS packets including a $2^{nd}$-$n^{th}$ header corresponding to the $2^{nd}$-$n^{th}$ IDS. For the $2^{nd}$-$n^{th}$ IDS packets, the process further may include: performing the receiving, decompressing, decrypting, identifying, first calculating, and comparing operations. The process may include: updating the total signature, while the $2^{nd}$-$n^{th}$ IDS packets are decrypted, to generate a running total signature. The running total signature may be a hash value. The process may include: after decrypting the $n^{th}$ IDS packet, extracting a second signature from the $n^{th}$ header; comparing the second signature to the running total signature; and accepting, when the second signature matches the running total signature, the $1^{st}$-$n^{th}$ IDSs for use by the client device. The client device may be coupled to the server by an Ethernet switch. The client device may be coupled to the server via, at least in part, an Internet connection. The client device may be coupled to the server by an Ethernet switch forming a local area network within a factory. The process may include: prior to requesting the $1^{st}$ IDS, performing an image data reset operation on the client device. Implementations of the described techniques may include hardware, a method or process, or computer software on a computer-accessible medium.

For at least one implementation, a device may include a processor and an image data store, coupled to the processor. The image data store non-transiently stores computer instructions, which upon execution by the processor, instantiate a re-imager engine. The device may include a communication interface coupled to at least the processor. When instantiating the re-imager engine, the device performs operations may include: locating an IDV; where the IDV includes a $1^{st}$ IDS, and a respective $2^{nd}$-$n^{th}$ IDS. The device may perform operations including retrieving the $1^{st}$ IDS; generating a first signature for the $1^{st}$ IDS; encrypting the first signature and the $1^{st}$ IDS; generating a second signature for the, as encrypted, $1^{st}$ IDS; generating a first header for the, as encrypted, $1^{st}$ IDS; compressing the first header and the, as encrypted, $1^{st}$ IDS; packetizing the as compressed first header and encrypted $1^{st}$ IDS into a $1^{st}$ IDS packet; and upon receiving a request from a second device, communicating the $1^{st}$ IDS packet to the second device. Other embodiments of this aspect include corresponding computer systems, apparatus, and computer programs recorded on one or more computer storage devices, each configured to perform the actions of the methods.

Implementations may include one or more of the following features. The device may be a server. The communications interface may couple the device to the second device via an Ethernet switch. The communications interface may couple the device to the second device via an Internet connection. The device may be a main device; where the second device is a sub-device; and where the main device is coupled to the sub-device via an Ethernet switch. The main device may be a DISH Network HOPPER™. The sub-device may be a DISH Network JOEY™. The sub-device may execute at least one discovery protocol which identifies the device to the sub-device as a source of the IDV. The device may perform the locating the IDV operation based upon a request from the sub-device to re-image image data on the sub-device. Implementations of the described techniques may include hardware, a method or process, or computer software on a computer-accessible medium.

For at least one implementation, a system for re-imaging a first device may include a first processor and a first image data store, coupled to the first processor. The first image data store non-transiently stores first computer instructions which, upon execution by the first processor, instantiate a first re-imager engine. The system may include a first communication interface coupled to the first processor and the first image data store.

The system may include a second device that may include: a second processor and a second image data store, coupled to the second processor. The second image data store may non-transiently stores second computer instructions which, upon execution by the second processor, instantiate a second re-imager engine.

The system may include a second communication interface coupled to the second processor and the second image data store. The system may include an ethernet switch which couples the first device to the second device. The system may include, where upon instantiating the first re-imager engine, the first processor instructing the first device to performs first operations that may include: locating an IDV. The IDV may include a $1^{st}$ IDS and a respective $2^{nd}$ through $n^{th}$ IDS. The first operations may include retrieving the $1^{st}$ IDS; generating a first signature for the $1^{st}$ IDS; encrypting the first signature into a first encrypted packet that includes a first encrypted header portion and a first encrypted IDS portion; generating a second signature for first encrypted packet; generating a first unencrypted header for the first encrypted packet; compressing the first unencrypted header and the first encrypted packet to provide a first compressed-encrypted packet; packetizing the first compressed-encrypted packet into a $1^{st}$ IDS packet; and upon receiving a request from the second device, communicating the $1^{st}$ IDS packet to the second device.

Upon instantiating the first re-imager engine, the second processor may instruct the second device to performs second operations that may include: requesting the IDV from the first device, receiving theist IDS packet from the first device, decompressing the $1^{st}$ IDS packet into a first received unencrypted header and a first received encrypted packet, decrypting the first received encrypted packet to yield a third signature and the $1^{st}$ IDS, and comparing the third signature to the first signature. The system may include operations that, when the third signature matches the first signature, include accepting the $1^{st}$ IDS for potential use by the second device and otherwise rejecting the $1^{st}$ IDS for potential use by the second device. The above first operations and the second operations may be respectively repeated for the $2^{nd}$ IDS through the $n^{th}$ IDS. When the $n^{th}$ IDS is accepted for potential use by the second device, the second processor may instruct the second device to perform third operations that may include: calculating a final signature based upon a received IDV that includes the $1^{st}$ IDS through the $n^{th}$ IDS; extracting the second signature from the $n^{th}$ IDS; comparing the second signature to the final signature; accepting the received IDV for use by the second device when the second signature matches the final signature; and rejecting the received IDV for use by the second device when the second signature does not match the final signature. Other embodiments of this aspect include corresponding computer systems, apparatus, and computer programs recorded on one or more computer storage devices, each configured to perform the actions of the methods.

Implementations may include one or more of the following features. The first device may be a main device and the second device is a sub-device. The second image data store may non-transiently stores third computer instructions which, upon execution by the second processor, instantiate a sub-device discovery engine. Upon instantiating the sub-device discovery engine, the second processor may instruct the second device to performs third operations that may include: identifying whether the first device is a main device; and if "no", seeking a server coupled to the second device via a network connection. The server may be a repository for the IDV. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

FIG. 8 is a flow chart representing a process for re-imaging image data in a factory setting and in accordance with at least one implementation of the present disclosure.

FIG. 9 is a flow chart representing a process for re-imaging image data in a factory setting and in accordance with at least one implementation of the present disclosure.

DETAILED DESCRIPTION

Figure 1:
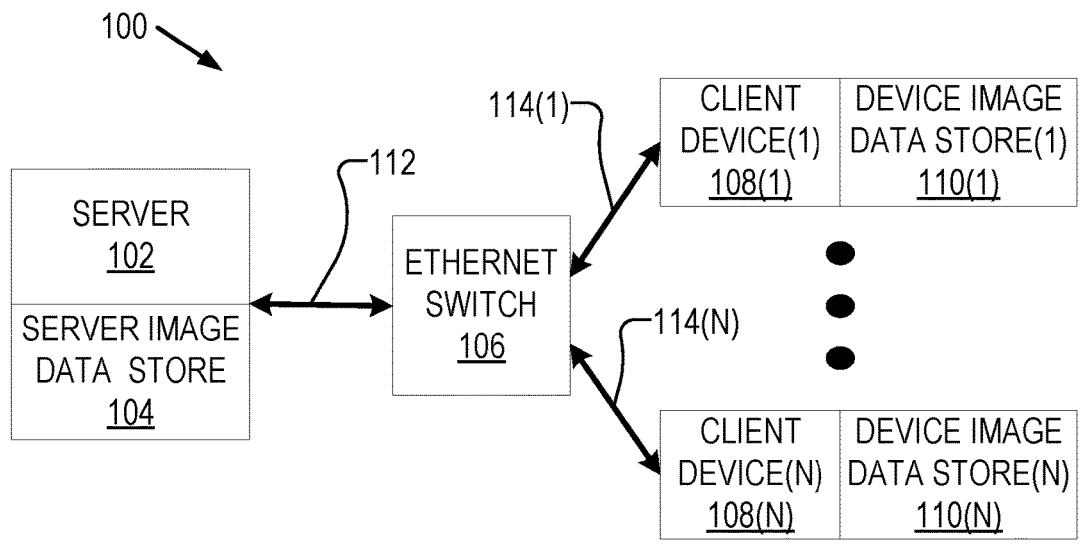
FIG. 1 is a schematic representation of a system for re-imaging image data on an electronic device in a factory setting and in accordance with at least one implementation of the present disclosure.

Various implementations of the present disclosure describe devices, systems, and processes for re-imaging image data on one or more electronic devices in at least one of a factory setting and/or a field setting. A re-imaging operation may be performed in response to an image data reset, to initial configure a device, or otherwise.

As used herein, "image data" may include one or more of "data" and "instructions" (as described herein).

"Data" (which is also referred to herein as a "computer data" and "data packet(s)") refers to any representation of facts, information, or concepts in a form suitable for processing by one or more electronic device processors and which, while and/or upon being processed, cause or result in an electronic device or other device to perform at least one function, task, operation, provide a result, or otherwise. Data may exist in a transient and/or non-transient form, as determined by any given use of the data.

An "Instruction" (which is also referred to herein as a "computer instruction") refers to a non-transient processor executable instruction, associated data structure, sequence of operations, program modules, or the like. An instruction is defined by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise.

"Processor" refers to one or more known or later developed hardware processors and/or processor systems configured to execute one or more computer instructions, with respect to one or more instances of data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

A "computer engine" (or "engine") refers to a combination of a "processor" and "computer instruction(s)." A computer engine executes computer instructions to perform one or more logical operations (herein, a "logic") which facilitate various actual (non-logical) and tangible features and function provided, in whole or in part, by an electronic device.

"Substantially simultaneous(ly)" means without incurring a greater than expected and humanly perceptible delay between a first event or condition and second event or condition. Substantial simultaneity may vary in a range of quickest to slowest expected delay to a longer delay. It is to be appreciated that the subject and acceptable threshold of "substantial simultaneity" may include considerations of distance, data processing capabilities and/or and data communication capabilities. For example, content provided in data packets over gigabit Ethernet capable local area network (LAN) connections may have a shorter acceptable delay period (and a more stringent substantially simultaneous requirement) than content presented over a 3G network, where data communications are knowingly slower and thus a given (longer) delay period may satisfy a subject substantially simultaneous threshold.

"Cloud" refers to cloud computing, cloud storage, cloud communications, and/or other technology resources which a given user does not actively manage or provide. A usage of a Cloud resource may be private (limited to certain users and/or uses), public (available for users and/or uses), hybrid, dedicated, non-dedicated, or otherwise. It is to be appreciated that implementations of the present disclosure may use Cloud resources to provide for processing, storage and other functions related to facilitating live cell phone watch parties.

"Module" recites definite structure for an electrical/electronic device that is configured to provide at least one feature and/or output signal and/or perform at least one function including the features, output signals and functions described herein. Such a module may provide the one or more functions using computer engines, processors, computer instructions and the like. When a feature, output signal and/or function is provided, in whole or in part, using a processor, one more software components may be used, and a given module may be include a processor configured to execute computer instructions. A person of ordinary skill in the art (a "POSITA") will appreciate that the specific hardware and/or computer instructions used for a given implementation will depend upon the functions to be accomplished by a given module. Likewise, a POSITA will appreciate that such computer instructions may be provided in firmware, as embedded software, provided in a remote and/or local data store, accessed from other sources on an as needed basis, or otherwise. Any known or later arising technologies may be used to provide a given module and the features and functions supported therein.

"Device" refers to electronic devices used to present content in a humanly perceptible format. A device may include and/or be communicatively coupled to one or presentation devices, such as a display device, audible output device, or otherwise. Non-limiting examples of devices include smart phones, smart televisions, tablet computing devices, lap-top computers, desk-top computers, gaming consoles, cable/satellite set-top-boxes (STB), 10-Foot presentation devices, and others.

"Coupling" refers to establishment of a communications link between two or more elements of a given system. A coupling may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise. One or more communications and networking standards and/or protocols may be used including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, and others.

A coupling may include use of physical data processing and communication components. A coupling may be physically and/or virtually instantiated. Non-limiting examples of physical network components include data processing and communications components including computer servers, blade servers, switches, routers, encryption components. decryption components, and other data security components, data storage and warehousing components, and otherwise. Any known or later arising physical and/or virtual data processing and/or communications components may be utilized for a given coupling.

Factory System 100

As shown in FIG. 1, a factory system 100 for re-imaging image data on one or more electronic devices may include a server 102 that includes and/or is coupled to a server image data store 104. The server 102 is further coupled to one or more client devices 108 by an Ethernet switch 106 or the like. A first coupling 112 may couple the server 102 to the Ethernet switch 106 and one or more second coupling(s) 114(1)-(N) may couple the Ethernet switch 106 to the one or more client devices 108.

The one or more client devices 108 may be any form of electronic device or the like that contains or have access to a device image store 110. The device image store 110 provides for persistent and non-volatile storage of image data (and other data and instructions). The device image data store 110 is a repository in which image data may be non-transiently and persistently stored. A prior instance of such image data may be corrupt or have been wiped from a given data store during an image data resetting operation. Such image data resetting operations may occur, with respect to an image data for a given electronic device, in whole or in part. Image data resetting operations may occur using any known and/or later arising technologies, processes, devices, systems, or the like and are otherwise beyond the scope of the present disclosure.

For at least one implementation, image data resetting operations are performed in whole or in part, prior to re-imaging data operations are performed for a given device. For another implementation, re-imaging data operations are performed without regard to whether an image data resetting operation has or has not been performed with respect to some or all of a given image data for a given device.

Server 102

Figure 2:
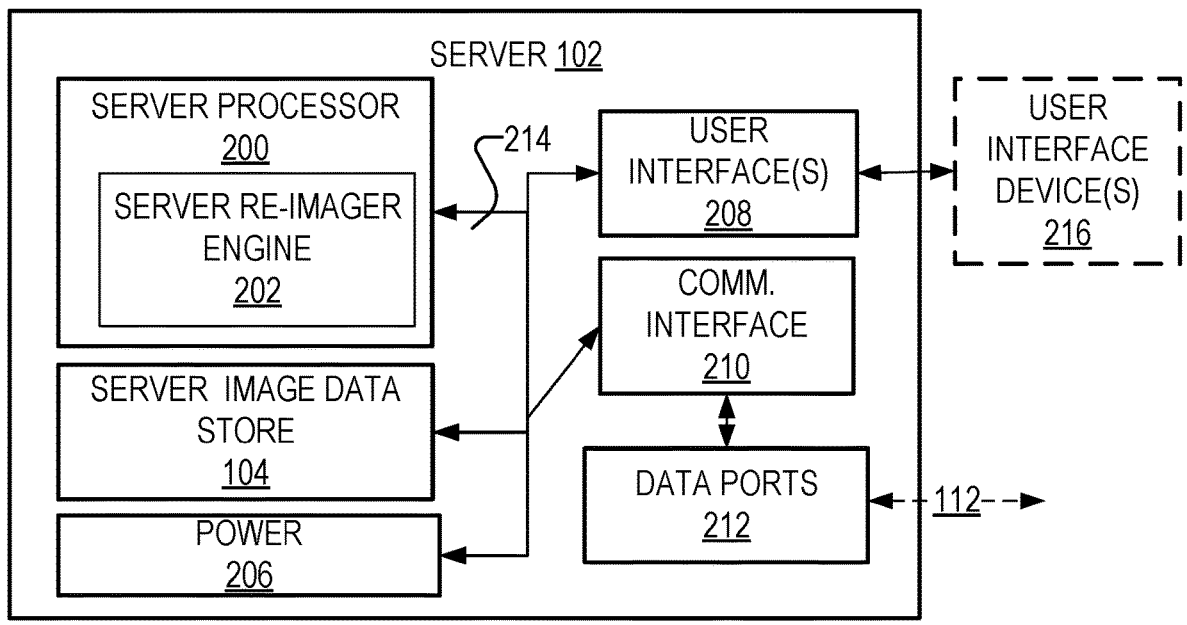
FIG. 2 is a schematic representation of a server configured for re-imaging image data on an electronic device in a factory setting and in accordance with at least one implementation of the present disclosure.

As shown in FIG. 2 and for at least one implementation of the present disclosure, a server 102 may include a server processor 200 executing one or more computer engines including a re-imager engine 202. The server 102 also includes a server image data store 104, a server power supply 206, a server user interface 208, a server communications interface 210, one or more server data ports 212, and a server bus 214.

Server Processor 200

The server 208 may include a processor 200 (herein, also identified as a server central processing unit (CPU) or "server CPU"). Any known or later arising processor may be used. The server processor 200 may be provided by a processing device capable facilitating one or more logics by executing one more computer instructions with respect to data. The re-imager engine 202 may be executed by one or more threads on the server processor 200, or otherwise. The server processor 200 may include one or more physical components configured for such data processing operations. Any known or later arising technologies may be utilized in conjunction with an implementation of the present disclosure to facilitate the server processor 200 and the re-imager engine 202.

The server 102 may instantiate one or more computer engines as one or more threads operating on a computing system having a multiple threaded operating system, such as the WINDOWS 10 operating system, LINUX, APPLE OS, ANDROID, and others, as an application program on a given device, as a web service, or otherwise. An Application Program Interface (API) may be used to support an implementation of the present disclosure. The server 102 may be provided in the virtual domain and/or in the physical domain. The server 102 may be associated with a human user, a machine process executing on one or more computing devices, an API, a web service, instantiated on the Cloud, distributed across multiple computing devices, or otherwise. The server 102 may be any electronic device configurable to communicate data using a network, directly or indirectly, to another device, to another server, or otherwise.

The server processor 200 may be communicatively coupled, by a server data bus 214 or similar structure, to other components of the server 200 including, but not limited to, the server image data store 104, which may also be referred to as a "server computer readable storage medium."

Server Re-Imager Engine 202

With reference to the operations depicted in FIG. 4 (as further described below), the server re-imager engine 202, in conjunction with a client re-imager engine 302 (as further described below) manages one or more of the packeting (e.g., separation of the image data file into transmittable packets) and transmission of image data, in whole or in part, to one or more client devices 108 for loading thereon. The packeting may include one or more operations including compressing, signing, encrypting, and transferring image data segments (IDSs), obtained from a given one or more image data volumes (IDV), from the image data store 104 to the client device(s) 108. For at least one implementation, the server re-imager engine 202 may be configured to identify communicable and processable image data segments (IDSs, as obtained from all or a larger portion of image data volume (IDV), for communication to a client device 108.

The server re-imager engine 202 may be configured to query a given client device 108 as to that device's configuration and capabilities in determining how to packet the IDSs for transmission to and processing by the client device 108. It is to be appreciated that packeting of an IDS may vary by client device, network capabilities, network constraints, and otherwise. For example, a size of a communicable IDS packet may be the same or different than a size of a processable IDS by a given client device 108. For example, an available bandwidth between the server 102 and a given client device 108 may or may not limit characteristics of an IDS packet.

Characteristics of an IDS packet, as packetized by a server re-imager engine 202, may vary based on other communications characteristics, such as urgency, acceptable delay, errors tolerated, and otherwise. Characteristics of an IDS packet may vary based on client device 108 properties, such as type of processor used (for example, 32-bit vs 64-bit processors), amount of cache accessible by a given processor, cores, threads, virtualizations, or the like available, an amount of random access memory (RAM) or other form of memory available, and the like. For at least one implementation, the server re-imager engine 202 may be configured to take network, user device 108 and other characteristics into consideration in the packeting and transmitting of IDSs in whole or in part, by a server 102 to one or more client devices 108.

Figure 4:
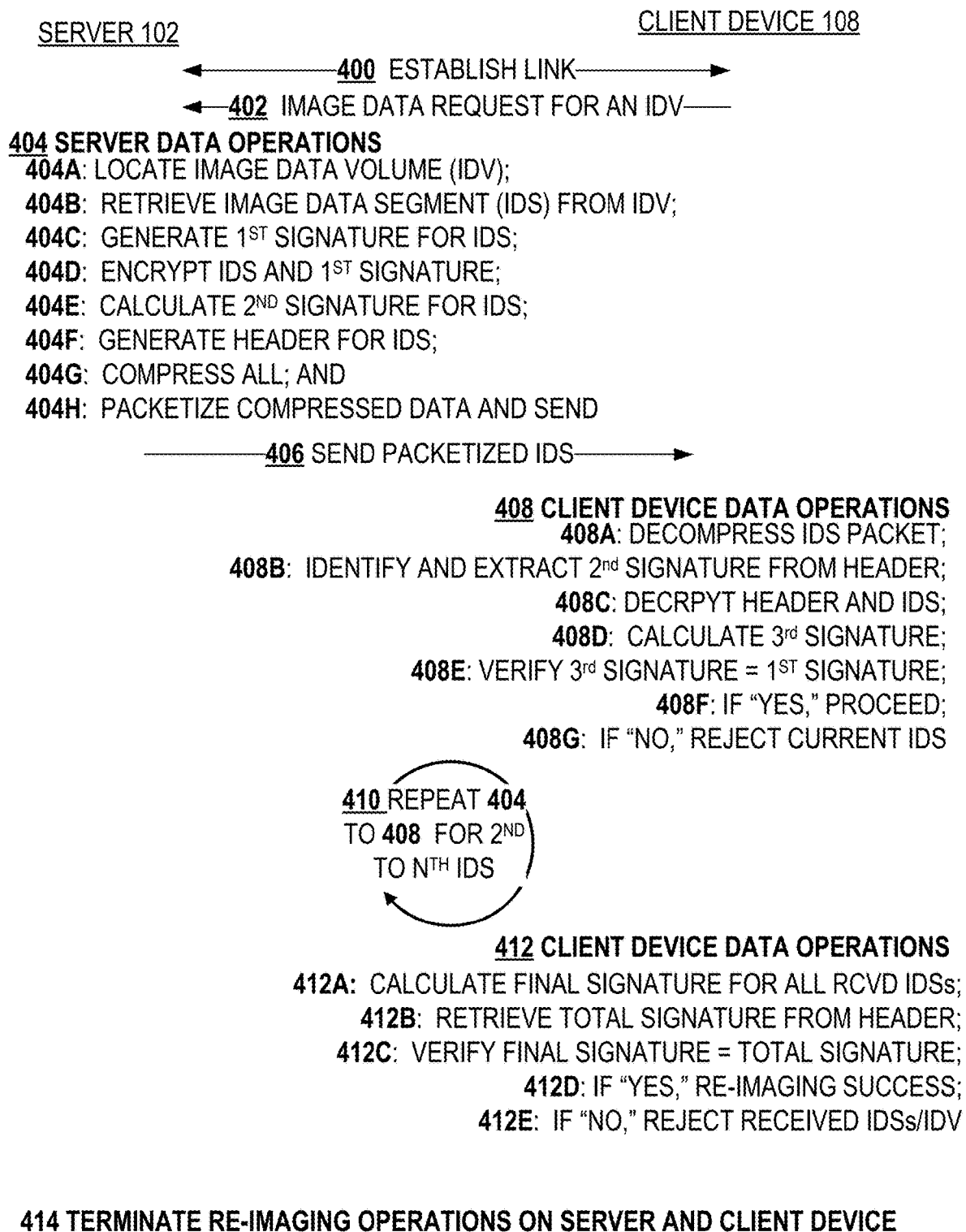
FIG. 4 is a flow chart representing a process for re-imaging image data in a factory setting and in accordance with at least one implementation of the present disclosure.

For at least one implementation, operations of the server re-imager engine 202 are illustrated in FIG. 4 herein (as further described below). Such operations are non-limiting and for at least one implementation of the present disclosure. Other operations, sequences thereof, combinations, and/or permutations thereof may be used in accordance with other implementations of the present disclosure.

Server Image Data Store 104

The server image data store 104 may be a storage, multiple storages, or otherwise. The server image data store 104 may be configured to store image data, in whole or in part, in any desired format, including but not limited to, clear-text, encrypted, uncompressed, compressed, signed, unsigned, combinations of the foregoing, packetizations, or otherwise. The server image data store 104 may be provided locally with the server 102 and/or remotely, such as by a data storage service provided on the Cloud, and/or otherwise. Storage of image data may be managed by a storage controller (not shown) or similar component. It is to be appreciated such storage controller manages the storing of image data and may be instantiated in one or more of the server image data store 104, the server processor 200, on the Cloud, or otherwise.

Any known or later arising storage technologies may be utilized in conjunction with an implementation of the present disclosure to facilitate the server image data store 104. Non-limiting examples of devices that may be configured for use as server image data store 104 include electrical storages, such as EEPROMs, random access memory (RAM), Flash drives, and solid-state drives, optical drives such as DVDs and CDs, magnetic storages, such as hard drive discs, magnetic drives, magnetic tapes, memory cards, such as Compact Flash (CF), Secure Digital (SD) cards, Universal Serial Bus (USB) cards, and others.

Available storage provided by the server image data store 104 may be partitioned or otherwise designated by the storage controller as providing for permanent storage and temporary storage. Non-transient data, computer instructions, or other the like may be suitably stored in the server image data store 104. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions, and other data.

Server Power 206

The server 102 may include a server power 206. The server power 206 may include any known or later arising technologies which facilitate the use of electrical energy by the server 102. Non-limiting examples of such technologies include batteries, power converters, inductive charging components, line-power components, solar power components, and otherwise.

Server User Interface 208

The server 102 may include a server user interface 208. The server user interface 208 may include any known or later arising human to device interface user interface device (s) 216 with the server 102. Non-limiting examples of user interface device(s) 216 include audible input/output ("I/O") interfaces for use with audio I/O devices, visual I/O interfaces for use with visual I/O devices, and the like.

For at least one implementation, an audio I/O interface may support a receiving and/or presenting of audible content. Such audible content(which is also referred to herein as being "audible signals") may include spoken text, sounds, or any other audible information. Such audible signals may include one or more of humanly perceptible audio signals, where humanly perceptible audio signals typically arise between 20 Hz and 20 KHz. The range of humanly perceptible audio signals may be configurable to support an audible range of a given individual user. An audio I/O interface includes hardware and computer instructions (herein, "audio technologies") which supports the input and output of audible signals between a user and an electronic device, such as a server 102, a client device 108, and/or main device 502. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user.

A visual I/O interface includes hardware and computer instructions (herein, "visible technologies") which supports the input by and output of visible signals to a user using a server 102, a client device 108, and/or a main device 502. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more visual I/O devices, such as the internal display (not shown) and/or external display (not shown), that are configured to present visible signals to a user. A visual I/O interface may be configured to use one or more image capture devices. Non-limiting examples include lenses, digital image capture and processing software and the like. Accordingly, it is to be appreciated that any existing or future arising visual I/O interfaces, devices, systems and/or components may be utilized.

Server Communications Interface 210

The server 102 may include a server communications interface 210. The server communications interface 210 may be configured to use any known or later arising communications and/or networking technologies which facilitate coupling of the server 102 to other factory system 100 components. One or more data ports 212 (which are also commonly referred to an input/output interfaces, cards, or the like) may be used to facilitate coupling of the server 102 with one or more other factory system 100 components. Such communication interfaces are well-known in the art and non-limiting examples include Ethernet cards, USB and storage medium interface cards, radio frequency transceivers, and others. For at least one implementation, the communications interface 210 may be configured to couple with one or more antennas, such as a DBS antenna, a STARLINK™ ground station, a broadcast signal antenna (which may be colloquially often referred to as "rabbit ears"), and the like.

Client Device 108

Figure 3:
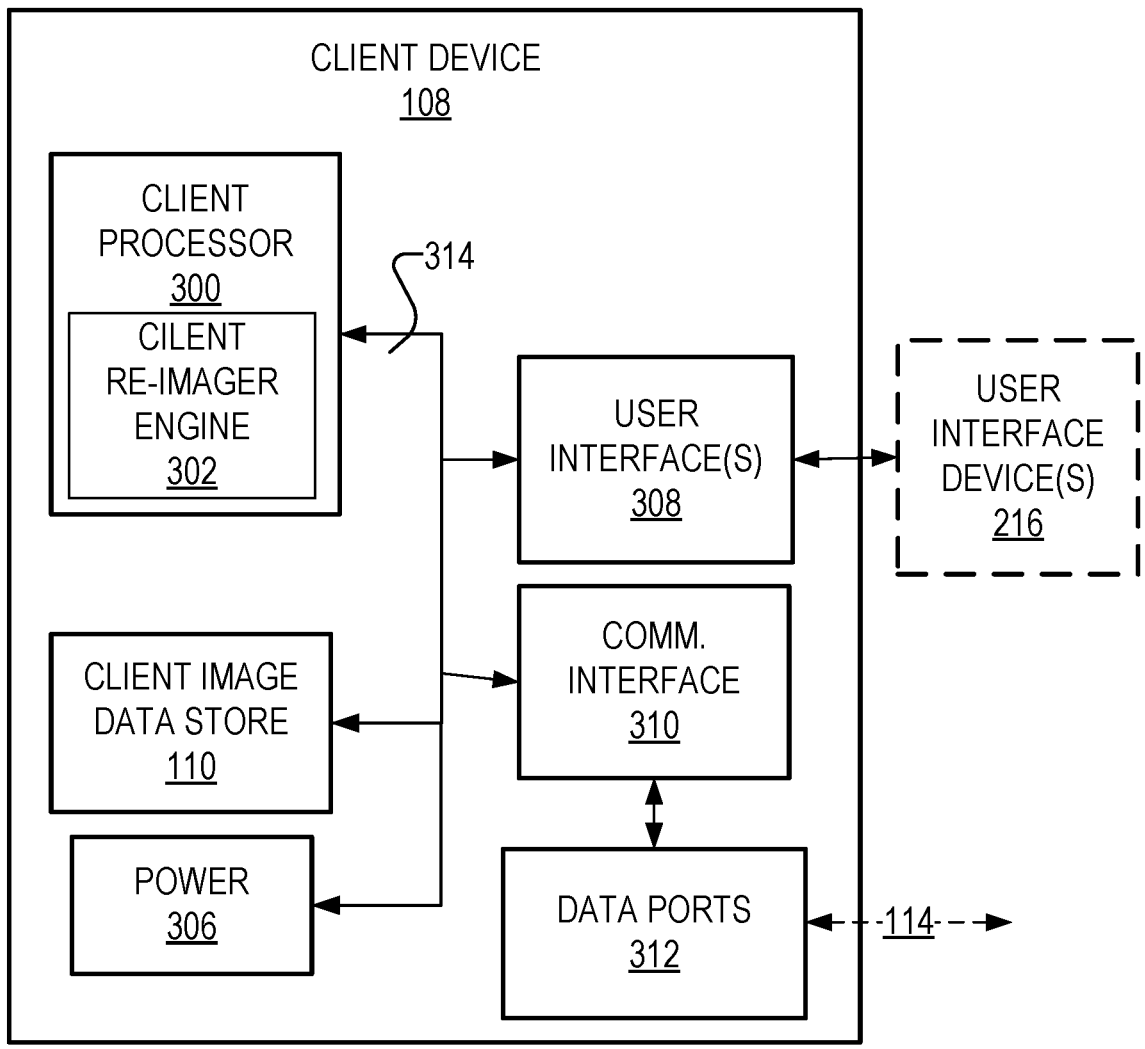
FIG. 3 is a schematic representation of a client device configured for re-imaging image data in a factory setting and in accordance with at least one implementation of the present disclosure.

As shown in FIG. 3 and in accordance with at least one implementation of the present disclosure, a client device 108 may include a client processor 300, a client re-imager engine 302, a client image data store 110, a client power 306, a client user interface 308, a client communications interface 310, and one or more client data ports 312. For at least one implementation, the client processor 300, client image data store 110, client power 306, client user interface 308, client communications interface 310 and/or client data ports 312 may be configured similarly and/or the same as corresponding components in the server 102, a main device 502 (as described below), or otherwise.

Client Re-Imager Engine 202

With reference to FIG. 3, the client re-imager engine 302, operating in conjunction and/or in cooperation with the server re-imager engine 202, manages the decompression, decryption and signature verification of IDS packets received from the server 102. For at least one implementation, operations of the client re-imager engine 302 are illustrated in FIGS. 4, 8 and 9 herein (as further described below). Such operations are non-limiting and for at least one implementation of the present disclosure. Other operations, sequences thereof, combinations, and/or permutations thereof may be used in accordance with other implementations of the present disclosure.

In FIG. 4, a process is shown for re-imaging and IDV, and/or one or more IDSs, in a factory setting and in accordance with at least one implementation of the present disclosure. The process involves cooperation between the server 102 and the client device 108. For at least one implementation, such respective cooperation may be provided by use of the server re-imager engine 202 and the client re-imager engine 302. Such cooperation may include the exchange of messages between the respective engines, processing of and IDV into multiple IDSs that are communicable in multiple IDS packets (by the server 102), communication of such one or more IDS packets to the client device 108, and conversion (by the client device 108) of the received IDS packets into usable image data, and the like.

As per Operation 400, the process may commence with a server 102 and a client device 108 establishing a communications link, such as the $2^{nd}$ coupling 114. The establishing of the communications link may use any known or later arising technologies which facilitate the exchange of messages and data between the server 102 and the given client device 108.

As per Operation 402, the process may include an image data request being communicated to the server 102, directly or indirectly, by the client device 108 for, in whole or in part, an image data volume (IDV) and/or one or more IDSs. For an implementation, the image data request may be communicated by use of an intermediary server, processor, device or otherwise. The image data request may be communicated by the given user device 108.

As per Operation 404, the process may include the server 102 performing one or more server data operations with respect to the requested image data in the IDV. When the image data for the requested IDV has been previously encrypted, signed and compressed, one or more of Operations 404 may not be executed. Otherwise, the server 102 may execute one or more of the following data operations:

404A: Locate image data volume (IDV);
404B: Retrieve image data segment (IDS) from IDV;
404C: Generate 1st Signature for retrieved IDS;
404D: Encrypt IDS and $1^{st}$ Signature;
404E: Calculate $2^{nd}$ Signature for IDS;
404F: Generate header for IDS containing $1^{st}$ signature, $2^{nd}$ signature, and other identifying information for an IDS packet;
404G: Compress IDS packet with header; and
404H: Packetize compressed IDS and send.

The server data operations 404 may be performed with respect to one or more IDS for a given IDV set singularly, in parallel, or otherwise. For an implementation, a header may contain, as unencrypted data, a version number or other identifier, $2^{nd}$ Signature data and an indication of the packet size in bytes. The header may contain, in an encrypted format a magic number and an initialization vector that may be utilized for cryptological purposes, the $1^{st}$ Signature, offset information (if any) identifying areas of a client image data store 110 to not utilize for storing the IDSs, and the like. Any known or later arising forms of cryptology may be used for an implementation of the present disclosure. For at least one implementation, RSA 256 bit, triple DES, Blowfish, Twofish, AES, or other forms of encryption may be used.

As shown in FIG. 8 and for at least one implementation, server data operations 804 may include operations 404A and 404B, as discussed above. Server data operations 804 may also include Operation 804B2, wherein an exclusion zone portion of the IDS is identified, and per Operation 804C2 and Operation 804E2, excluded from respective generation of the $1^{st}$ signature and the $2^{nd}$ signature for the IDS.

As per Operation 804D2, the header may be generated before the $2^{nd}$ signature for the IDS is calculated, as provided in Operations 404E and 804E2.

As per Operation 804G2, the data compressed, per Operation 404G, may be encrypted. Any known or later arising form of data encryption may be used for at least one implementation.

As per Operation 804G3, the process may include generating a second header that includes the $2^{nd}$ signature (as calculated per one or more of Operations 404E and 804E2) and an initialization vector utilized in encrypting the compressed data (as per Operation 804G2).

As per Operation 804G4, the second header may be encrypted.

As per Operation 404H, the compressed data may be packetized and sent.

As per Operation 404I, the encrypted second header may be communicated to the client device 108. The encrypted second header may be communicated separately, in conjunction with, at a later time, or not at all with respect to the compressed data that is communicated by the server to the client device per Operation 406, as described below.

As shown in FIG. 4 and per Operation 406, the process may include the server 102 sending the compressed IDS packet to the client device 108. The IDS packet may be suitably read into memory, such as into RAM, cache, or the like, and further processing by the client device processor 300.

As per Operation 408, the process may include the client device processor 300 performing one or more of the client data operations on the received IDS packet:
 408A: Decompress IDS Packet;
 408B: Identify and Extract $2^{nd}$ Signature from header;
 408C: Decrypt header and IDS;
 408D: Calculate 3rd Signature for IDS;
 408E: Verify $3^{rd}$ Signature matches $1^{st}$ Signature;
 404F: If "Yes," proceed to next IDS; and
 404G: If "No," reject current IDS.

As per Operation 410, the process may continue one or more IDSs in a given IDV until the requested IDSs, which may be all or less than all IDSs in a given IDV, have been processed, as per Operations 404 and 408, with an additional step of updating a "total signature" with values for each of the $2^{nd}$ Signatures calculated for a given IDS. The total signature represents a running total for the IDSs, as then communicated by the server 102 to the client device 108.

As per Operation 412, when all of the requested IDSs for a given IDV have been communicated by the server 102 to the client device 108, the process may include, on the client device 108:
 412A: Calculating a final signature for all of the received, decompressed, and decrypted IDS;
 412B: Retrieve the total signature from header of the last received IDS;
 412C: Verifying the final signature matches the total signature;
 412D: If "YES," the re-imaging is a success and the IDS/IDV is accepted for use on the client device; and
 412E: If "NO", rejecting the received IDS/IDV.

As per Operation 414, the process then terminates on both the server 102 and the client device 108. If the re-imaging was rejected, in whole or in part, the process may be repeated in whole or in part, with respect to the IDVs and/or one or more IDSs thereof.

It is also to be appreciated that other common data communication and verification operations may be performed on the server 102 and client device 108 with respect to one or more IDSs and the IDV. Non-limiting examples of such operations include cyclic redundancy checks, error detection, forward error correction, use of checksums, use of cryptographic hash functions (as applied to IDS while in transit), or the like.

As shown in FIG. 9, a process for re-imaging image data in a device may include one or more Client Device Data Operations 907 which may be used in lieu of and/or in addition to client device data operations 408 (as shown in FIG. 4) and may further include one or more header operations 908, IDS operations 910, and verification operations 912 (as further described herein).

As per Operations 908A-908H, one or more header operations 908 may be performed.

As per Operation 908A, the process may include a client device 108 requesting a 1st header for a $1^{st}$ IDS request, from the server 102. The 1st IDS request may include a data size that is based upon available resources for a given client device 108. Non-limiting examples of such available resources may include random access memory ("RAM") limitations, processor data size limitations, storage device limitations, and otherwise.

As per Operation 908B, the process may include, upon the client device 108 receiving and processing the $1^{st}$ header, computing a $1^{st}$ header signature for the 1st header. As used herein, "processing the header" may include one or more of decompressing, decrypting, or performing other data processing operations on the $1^{st}$ header.

As per Operation 908C, the process may include repeating Operations 908A and 908B until processing of the $1^{st}$ header is complete.

As per Operation 908D, the process may include, requesting a $2^{nd}$ header for a $2^{nd}$ IDS request. The $2^{nd}$ IDS request may include a second data size that is based upon available resources for a given client device 108. The second data size may be larger, equal to, or smaller than the first data size.

As per Operation 908E, The processing may include computing a $2^{nd}$ header signature for the $2^{nd}$ header.

As per Operation 908F, the process may include repeating Operations 908B and 908C until processing of the $2^{nd}$ header is complete.

As per Operation 908G, the process may include computing a $1^{st}$ accumulated signature ("1AS") based on the $1^{st}$ header signature and the $2^{nd}$ header signature.

As per Operation 908H, the process may include repeating Operations 908D-908F until an Nth header for an Nth IDS request has been received, an Nth header signature has been computed, and the $1^{st}$ header signature through Nth header signature have been accumulated, with the result being provided as the 1AS.

As per Operations 910A-910K, one or more IDS operations 910 may be performed.

As per Operation 910A, the process may include requesting transmission of the $1^{st}$ IDS packet from the server 102 to the client device 108.

As per Operation 910B, the process may include decompressing the $1^{st}$ IDS packet.

As per Operation 910C, the process may include decrypting the $1^{st}$ IDS packet.

As per Operation 910D, the process may include computing a $1^{st}$ IDS signature for the first IDS packet.

As per Operation 910E, the process may include writing the $1^{st}$ IDS packet and the $1^{st}$ IDS signature to non-volatile storage.

As per Operation 910F, the process may include request a $2^{nd}$ IDS packet.

As per Operation 910G, the process may include decompressing the $2^{nd}$ IDS packet.

As per Operation 91011, the process may include decrypting the $2^{nd}$ IDS packet.

As per Operation 9101, the process may include computing a $2^{nd}$ IDS signature.

As per Operation 910J, the process may include computing a $2^{nd}$ accumulated signature ("2AS") based on the $1^{st}$ IDS signature and the $2^{nd}$ IDS signature.

As per Operation 910K, the process may include repeating Operations 908M-908R until all IDS packets in a given IDV have been processed.

As per Operations 912A-912C, one or more verification operations 912 may be performed.

As per Operation 912A, the process may include verifying that the $1^{st}$ header signature matches the $1^{st}$ IDS signature.

As per Operation 912B, the process may include verifying that the $2^{nd}$ through Nth header signatures respectively match the $2^{nd}$ through Nth IDS signatures.

As per Operation 912C, the process may include verifying the 1AS matches the 2AS.

As per Operation 912D, the process may include designating the re-imaging as either a "success" or a "failure". A "success" may be designated when each of the verifications performed per Operations 912A, 912B and 912C are successful (i.e., the relevant signatures match). When successful, the re-image data is suitable for use in the client device 108. A "failure" may occur when any of the verifications performed per Operations 912A-912C are not successful (i.e., the relevant signatures do not match). When a "failure" occurs, the entire IDV may be rejected for use in the client device 108.

It is to be appreciated that the operations described above and depicted in FIGS. 4, 8 and 9 are illustrative and are not intended herein to occur, for all implementations of the present disclosure, in the order shown, in sequence, or otherwise. One or more operations may be performed in parallel, and operations may be not performed, as provided for any given use of an implementation of the present disclosure.

Field System 500

Figure 5:
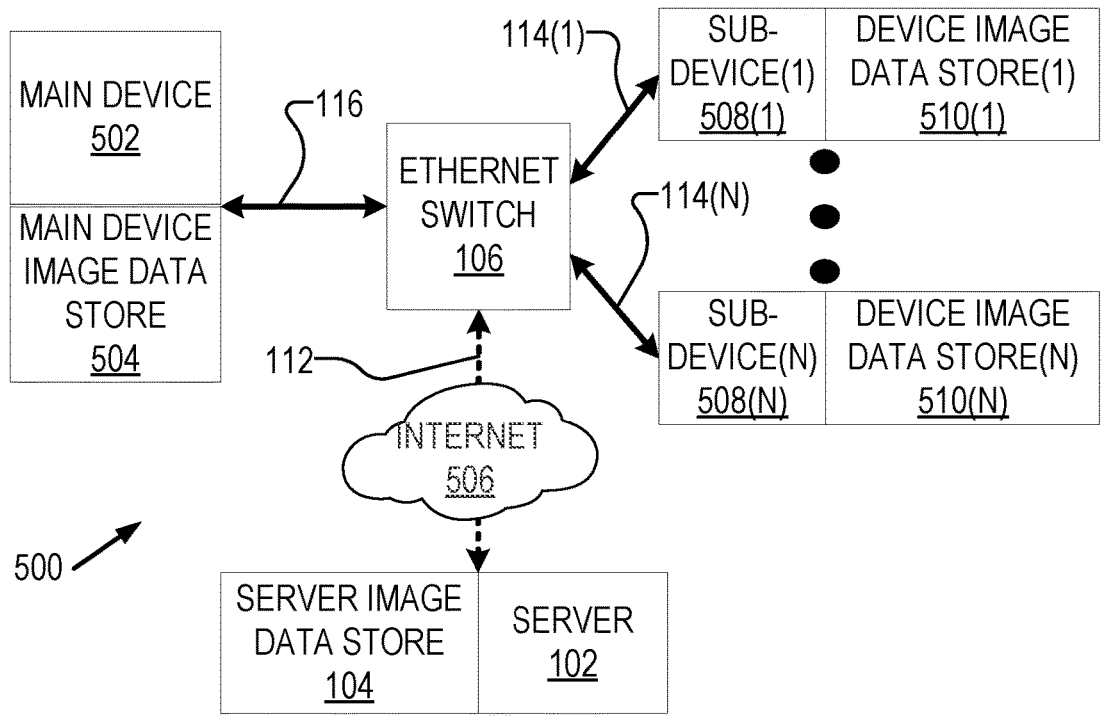
FIG. 5 is a schematic representation of a system for re-imaging image data on an electronic device in a field setting and in accordance with at least one implementation of the present disclosure.

As shown in FIG. 5 and for at least one implementation, a field system 500 implementation may include a main device 502 coupled to an Ethernet switch 106 (router or the like) and further coupled to the server 102 via the Internet 506 or another communications network. For an implementation, the main device 502 may be re-imaged, in whole or in part, by requesting, receiving, and otherwise processing IDS Packets using the above described principles of Operation shown in FIG. 4. The Ethernet switch 106 may for a local area network (LAN) to which the main device 502 and one or more sub-device(s) 508 may be communicatively coupled.

The main device 502 may also be used to re-image other subsidiary devices (each a "sub-device") that may be communicatively coupled to the main device 502 via the Ethernet switch 106, directly, or otherwise. As used herein, a sub-device 508 is an electronics device that depends, in part, upon a main device 502 for one or more data processing, presentation, communication, or other operations. A non-limiting example of a sub-device 508 is a DISH NETWORK JOEY device which is configured for use with a main device 502, such as a DISH NETWORK HOPPER device.

As further shown, the main device 502 may include and/or be coupled to a main device image data store 504. For at least one implementation, the main device image data store 504 may contain an IDV and/or one or more IDSs used by a sub-device 508. The sub-device 508 may also be coupled to a sub-device image data store 510 which may also contain an IDV and one or more IDSs used by the sub-device 508.

Figure 6:
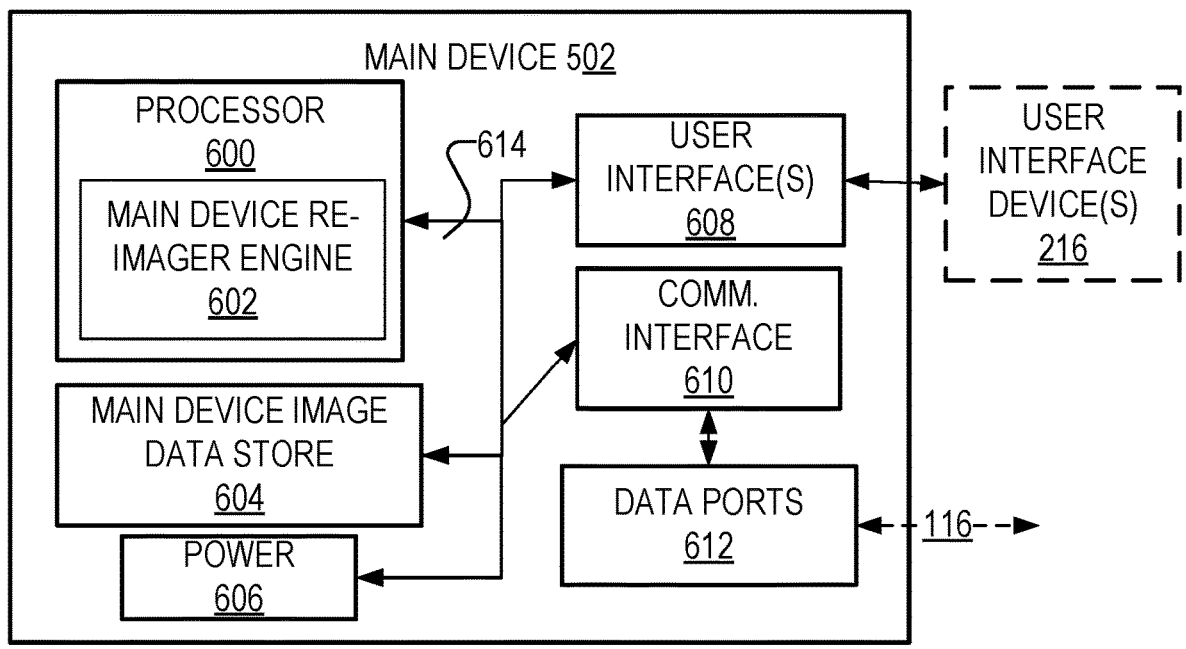
FIG. 6 is a schematic representation of a main device configured for re-imaging image data on an electronic device in a field setting and in accordance with at least one implementation of the present disclosure.

As shown in FIG. 6, a main device 502 may include a main device processor 600 configured to instantiate a main device re-imager engine 602. The main device re-imager engine 602 may be configured similarly to the server re-imager engine 202 and perform the operations depicted in FIG. 4. The main device 502 may further include a main device image data store 604, power 606, user interface(s) 608, communications interface(s) 610, data ports 612, bus 614, and the like. Such components may be configured similarly and/or the same as corresponding components in the server 102, or otherwise.

Figure 7:
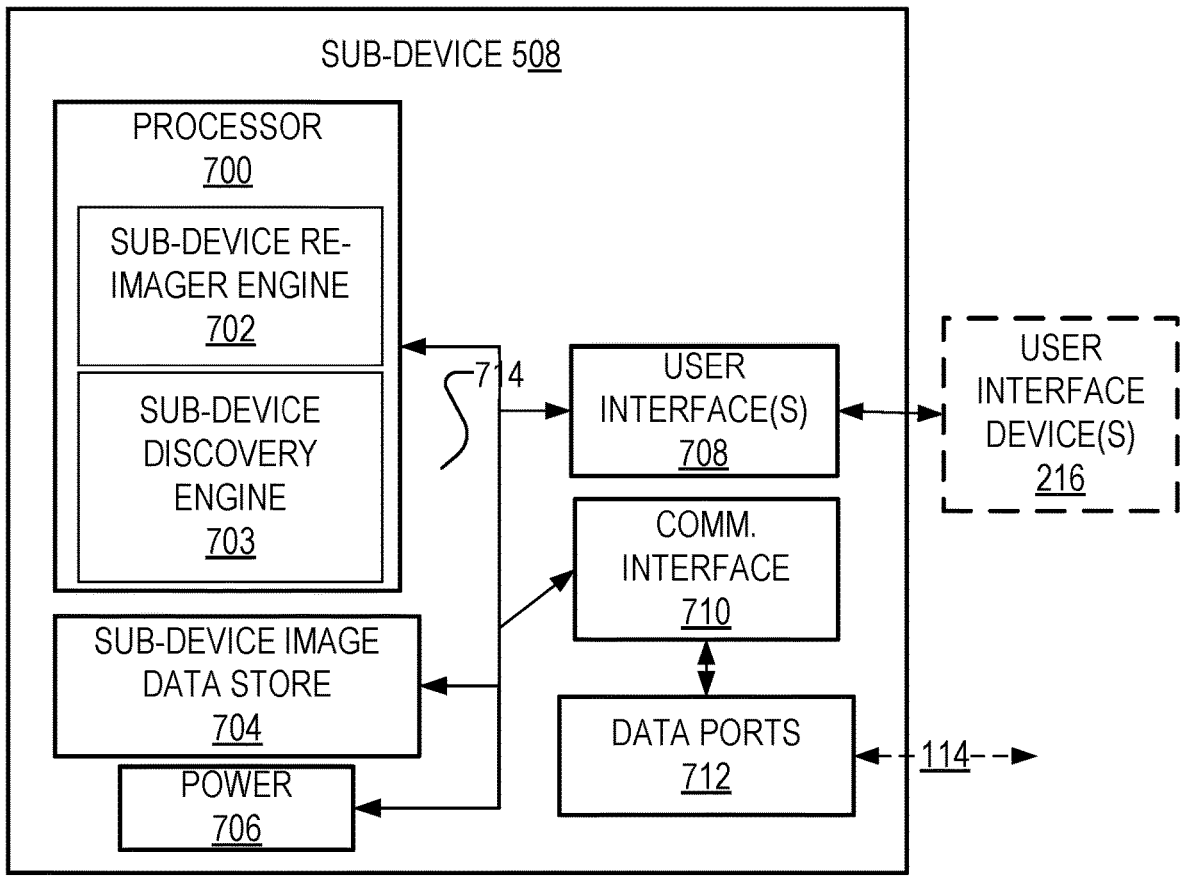
FIG. 7 is a schematic representation of a sub-device configured for being re-imaged with image data and in accordance with at least one implementation of the present disclosure.

As shown in FIG. 7, a sub-device 508 may include a sub-device processor 600 configured to instantiate a sub-device re-imager engine 702. The sub-device re-imager engine 702 may be configured similarly to the client re-imager engine 302 and perform one or more of the operations depicted in FIG. 4.

Additionally, the sub-device processor may be configured to execute non-transient computer instructions which instantiate a sub-device discovery engine 703 (the "discovery engine"). The discovery engine 703 may be configured to identify one or more main devices 508 (if any) that are communicatively coupled to the sub-device 508, and one or more IDVs and/or one or more IDSs stored thereon (if any). The discovery engine 708 may be further configured to instruct the sub-device re-imager engine 702 where to obtain one or more IDSs and/or IDVs from the one or more identified (via a discovery process) main devices 508. When a requested IDS or IDV is not available on a main device 502, the discovery engine 708 may be configured to discover whether a server 102 is communicatively coupled to the sub-device 508, determine whether the server 102 (when so coupled) can provide one or more IDVs and/or IDSs and, if so, instruct the sub-device re-imager engine 702 to obtain the IDVs and/or IDSs from the server 102. When the IDVs and/or IDSs are not obtainable from either a main device 502 and/or a server 102, the sub-device discovery engine 703 may be configured to render the sub-device 508 (when appropriate) into a limited operability state, a no operability state, or otherwise.

To discover main device(s) 502 and/or server(s) 102 that are communicatively coupled to a given sub-device 508, the discovery engine 703 may execute known network device discovery protocols, including but not limited to the Link Layer Discovery Protocol (LLDP), the Simple Network Management Protocol (SNMP), or the like.

The sub-device 508 may further include a main device image store 604, power 606, user interface(s) 608, communications interface(s) 610, data ports 612, bus 614, and the like. Such components may be configured similarly and/or the same as corresponding components in the server 102, or otherwise.

The sub-device 508 may further include a sub-device image data store 704, power 706, user interface(s) 708, communications interface(s) 710, data ports 712, bus 714, and the like. Such components may be configured similarly, differently, and/or the same as corresponding components in the server 102, the client device 302, the main device 502, or otherwise. The sub-device 508 may be configured to have less, the same as, or more capabilities as a client device 302, but less than a main device 502 to which the sub-device 508 is communicatively coupled at a given time.

Although various embodiments have been described above with a certain degree of particularity, or with reference to one or more individual embodiments, those skilled in the art could make numerous alterations to the disclosed embodiments without departing from the spirit or scope hereof. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes and are not intended to be limiting to any orientation or configuration of any elements or sequences of operations for the various embodiments of the present disclosure. Further, the terms "coupled," "connected" or otherwise are not intended to limit such interactions and communication of signals between two or more devices, systems, components or otherwise to direct interactions; indirect couplings and links may also occur. Further, the terms "and" and "or" are not intended to be used in a limiting or expansive nature and cover any range of combinations of elements and operations of an implementation of the present disclosure. Other embodiments are therefore contemplated. It is intended that matter contained in the above description and shown in the accompanying drawings shall be interpreted as illustrative of embodiments and not limiting. Changes in detail or structure may be made without departing from the basic elements of the present disclosure as defined in the following claims.

What is claimed is:

1. A device comprising:
    a processor;
    an image data store, coupled to the processor;
    wherein the image data store non-transiently stores computer instructions, which upon execution by the processor, instantiate a re-imager engine; and
    a communication interface coupled to at least the processor;
    wherein when instantiating the re-imager engine, the device performs operations comprising:
        locating an Image Data Volume (IDV); wherein the IDV includes a first Image Data Segment (IDS), and respective second ($2^{nd}$) through $N^{th}$ ($2^{nd}$-$N^{th}$) IDSs;
        retrieving the first IDS;
        generating a first signature for the first IDS;
        encrypting the first signature and the first IDS;
        generating a second signature for the, as encrypted, first IDS;
        generating a first header for the, as encrypted, first IDS;
        compressing the first header and the, as encrypted, first IDS;
        packetizing the as compressed first header and encrypted first IDS into a first IDS packet; and
        upon receiving a request from a second device, communicating the first IDS packet to the second device.

2. The device of claim 1,
    wherein the device is a server.

3. The device of claim 1,
    wherein the communications interface couples the device to the second device via an Ethernet switch.

4. The device of claim 1,
    wherein the communications interface couples the device to the second device via an Internet connection.

5. The device of claim 1,
    wherein the device is a main device;
    wherein the second device is a sub-device; and
    wherein the main device is coupled to the sub-device via an Ethernet switch.

6. The device of claim 5,
    wherein the sub-device executes at least one discovery protocol which identifies the device to the sub-device as a source of the IDV; and
    wherein the device performs the locating the IDV operation based upon a request from the sub-device to re-image image data on the sub-device.

7. The device of claim 1,
    wherein the operations further comprise:
        repeating each of the operations performed for the first IDS on each of the $2^{nd}$-$N^{th}$ IDSs.

8. The device of claim 7,
    calculating a total signature;
    wherein the total signature reflects running total of second signatures generated for each of the $2^{nd}$-$N^{th}$ IDSs; and
    wherein the second signature for the $N^{th}$ IDS equals the total signature.

9. A system for re-imaging a device comprising:
    a first device comprising:
    a first processor;
    a first image data store, coupled to the first processor;
        wherein the first image data store non-transiently stores first computer instructions which, upon execution by the first processor, instantiate a first re-imager engine; and
    a first communication interface coupled to the first processor and the first image data store;
    a second device, coupled to the first device, comprising:
        a second processor;
        a second image data store, coupled to the second processor;
        wherein the second image data store non-transiently stores second computer instructions which, upon execution by the second processor, instantiate a second re-imager engine; and
        a second communication interface coupled to the second processor and the second image data store; and
        wherein upon instantiating the first re-imager engine, the first processor instructs the first device to performs first operations comprising:
            locating an Image Data Volume (IDV);
            wherein the IDV includes a first Image Data Segment (IDS), and respective second ($2^{nd}$) through $N^{th}$ ($2^{nd}$-$N^{th}$) IDSs;
            retrieving the first IDS;
            generating a first signature for the first IDS;
            encrypting the first signature into a first encrypted packet that includes a first encrypted header portion and a first encrypted IDS portion;
            generating a second signature for the first encrypted packet;
            generating a first unencrypted header for the first encrypted packet;

compressing the first unencrypted header and the first encrypted packet to provide a first compressed-encrypted packet;
packetizing the first compressed-encrypted packet into a first IDS packet; and
upon receiving a request from the second device, communicating the first IDS packet to the second device;
wherein upon instantiating the second re-imager engine, the second processor instructs the second device to performs second operations comprising:
requesting the IDV from the first device;
receiving the first IDS packet from the first device;
decompressing the first IDS packet into a first received unencrypted header and a first received encrypted packet;
decrypting the first received encrypted packet to yield the first signature and the first IDS;
calculating a third signature for the first IDS;
comparing the third signature to the first signature;
when the third signature matches the first signature, accepting the first IDS for potential use by the second device and otherwise rejecting the first IDS for potential use by the second device;
respectively repeating the above first operations and the second operations for the $2^{nd}$ IDS through the Nth IDS;
when the Nth IDS is accepted for potential use by the second device, the second processor instructs the second device to perform third operations comprising:
calculating a final signature based upon a received IDV comprising the first IDS through the Nth IDS; and
extracting the second signature from the Nth IDS;
comparing the second signature to the final signature;
accepting the received IDV for use by the second device when the second signature matches the final signature; and
10 rejecting the received IDV for use by the second device when the second signature does not match the final signature.

10. The system of claim 9,
wherein the first device is a main device; and
wherein the second device is a sub-device.

11. The system of claim 10,
wherein the second image data store non-transiently stores third computer instructions which, upon execution by the second processor, instantiate a sub-device discovery engine;
wherein upon instantiating the sub-device discovery engine, the second processor instructs the second device to performs third operations comprising:
identifying whether the first device is a main device; and
if no, seeking a server coupled to the second device via a network connection;
wherein the server is a repository for the IDV.

12. The system of claim 9 further comprising:
an Ethernet switch coupling the first device with the second device.

13. The system of claim 9 further comprising:
repeating each of the operations performed by the first re-imager engine with respect to each of the respective $2^{nd}$-$N^{th}$ IDSs.

14. The system of 13, wherein the first operations further comprise:
calculating a total signature; and
wherein the total signature reflects running total of second signatures for each of the $2^{nd}$-$N^{th}$ IDSs accepted by the second re-imager engine; and
wherein the second signature for the Nth IDS equals the total signature.

15. The system of claim 14,
wherein the second operations further comprise:
comparing the final signature to the total signature.

16. A non-transitory computer readable medium storing non-transitory computer instructions which, when executed by a processor in a first device, instantiates a re-imager engine that configures the first device to perform operations comprising:
locating an Image Data Volume (IDV);
wherein the IDV includes a first Image Data Segment (IDS), and respective second ($2^{nd}$) through $N^{th}$ ($2^{nd}$-$N^{th}$) IDSs;
retrieving the first IDS;
generating a first signature for the first IDS;
encrypting the first signature and the first IDS;
generating a second signature for the, as encrypted, first IDS;
generating a first header for the, as encrypted, first IDS;
compressing the first header and the, as encrypted, first IDS;
packetizing the as compressed first header and encrypted first IDS into a first IDS packet; and
upon receiving a request from a second device, communicating the first IDS packet to the second device.

17. The non-transitory computer readable medium of claim 16, wherein a communications interface couples the first device to second device via an Internet connection.

18. The non-transitory computer readable medium of claim 16,
wherein prior to receiving the request from the second device, an image data reset operation has been performed on the second device.

19. The non-transitory computer readable medium of claim 16,
wherein prior to receiving the request from the second device, an image data reset operation has not been performed on the second device.

20. The non-transitory computer readable medium of claim 16,
wherein the first device is a main device; and
wherein the second device is a sub-device.

* * * * *